United States Patent [19]

Anderson, III et al.

[11] Patent Number: 4,633,250

[45] Date of Patent: Dec. 30, 1986

[54] COPLANAR ANTENNA FOR PROXIMATE SURVEILLANCE SYSTEMS

[75] Inventors: Philip M. Anderson, III, Chatham, N.J.; John J. Torre, Monroe, N.Y.

[73] Assignee: Allied Corporation, Morris Township, Morris County, N.J.

[21] Appl. No.: 689,271

[22] Filed: Jan. 7, 1985

[51] Int. Cl.$^4$ ........................ G01S 13/00; G08B 13/14

[52] U.S. Cl. ........................................ 342/27; 340/572; 340/552; 343/742

[58] Field of Search ............... 340/551, 552, 561, 572; 343/5 PD, 448, 742, 788, 867

[56] References Cited

U.S. PATENT DOCUMENTS 4,207,560 6/1980 Poirier ................................ 340/552
4,260,990 4/1981 Lichtblau ............................ 343/742
4,373,163 2/1983 Vandebult ........................... 340/572

*Primary Examiner*—Theodore M. Blum
*Attorney, Agent, or Firm*—Ernest D. Buff; Gerhard D. Fuchs

[57] ABSTRACT

A coplanar antenna system has an interrogating means adapted to generate time varying magnetic field components within a region proximate thereto and a receiving means adapted to detect magnetic field components within a region proximate to the antenna system. The interrogating means has a plurality of coils configured such that the components thereof have near zero net resultant magnetic field. At least one coil of the receiving means is configured to detect components thereof having a preselected net resultant magnetic field.

7 Claims, 4 Drawing Figures

10

— = HORIZONTAL FIELDS
• = VERTICAL FIELDS

COPLANAR ANTENNA FOR PROXIMATE SURVEILLANCE SYSTEMS

BACKGROUND OF THE INVENTION

1. Field of the Invention

This invention relates to proximate surveillance systems utilizing magnetic markers and to a coplanar antenna system for use therein. More particularly, the invention provides a coplanar antenna system that enhances the sensitivity and reliability of the proximate surveillance system with which it is associated.

2. Description of the Prior Art

One of the problems with proximate (less than 1 ft.) surveillance systems employed to detect magnetic markers is the presence of null or dead portions created within the interrogation zone by the orientation dependence of the antenna on the marker. Surveillance systems utilizing magnetic markers differ from electronic or microwave systems in that the frequencies of the signals used to interrogate the magnetic markers are relatively low (below 300 KHZ). These low frequencies require a linear antenna of impractical lengths (more than 500 M); thus alternate antennae configurations are required, such as loops. When applied to proximate surveillance systems, these alternate antennae configurations develop dead portions in which magnetic markers may escape detection. A dead zone is the result of improper orientation of magnetic fields generated by the antenna relative to the orientation of a magnetic marker. At remote detection distances (greater than 1 ft.), the orientation dependence of this antenna on the marker is decreased and the creation of dead portions within the interrogation zone is minimized. Surveillance systems utilizing magnetic markers are presently designed to operate at remote detection distances. Optimum system effectiveness is therein achieved by placing the interrogating and receiving means of the antenna system on opposite sides of the interrogation zone. Such an antenna configuration is unsuitable for a proximate surveillance system, wherein a flat coplanar antenna arrangement is more useful.

One of the problems encountered by coplanar antenna systems, in which the receiving and interrogating means are closely coupled, is known as the transformer effect. The close coupling between the receiving and interrogating means causes signals generated by the interrogating means to be altered by opposing signals induced in the receiving means, disabling the interrogation and detection functions. In an effort to solve this problem, it has been known in the art to form the receiving means as a "figure 8" which, upon exposure to the interrogating means, produces a zero resultant induced voltage in the receiving means. This solution causes a second problem, that is, a dead zone is created in a plane perpendicular to and in the center of the receiving means. To avoid this second problem it has also been known in the art that the interrogating means can be formed as a FIG. 8 and the receiving means be formed as a single loop centered about the interrogating means. This reduces the transformer effect but does not substantially reduce the orientation dependence of the antenna on the marker. One way known in the art to minimize orientation problems when using figure 8's for the interrogating means is to have two sets of figure 8's positioned perpendicular to each other in parallel planes. By having each FIG. 8 alternate interrogations, a magnetic field can be generated that alternates orientation by 90°. But this method has a serious drawback. The transformer effect between the two interrogating figure 8's reduces the actual field experienced by the marker, thereby reducing the system's sensitivity. Still another method known in the art for reducing the transformer effect involves an arrangement in which the same loop is used for each of the interrogating means and the receiving means. With this arrangement, the interrogating and receiving means are connected and disconnected alternately. A drawback of the single loop arrangment is the difficulty of isolating the receiving means from the high power extant during the connect and disconnect of the interrogating means. As a result, proximate surveillance systems of the type described have heretofore had sensitivities insufficient to afford the high reliability required for commercial applications.

SUMMARY OF THE INVENTION

The present invention provides a coplanar antenna system that eliminates transformer effect between each interrogating means and also between interrogating and receiving means and thereby enhances the sensitivity and reliability of proximate surveillance systems which utilize magnetic markers. The coplanar antenna system enables a magnetic marker to be detected in any orientation relative to the antenna system when the marker is positioned on or proximate to (less than 12 inches from) the antenna system.

Generally stated, the invention provides a coplanar antenna system comprising two parts, an interrogating means and a receiving means. The interrogating means is adapted to generate time varying magnetic field components within a region proximate thereto. The interrogating means comprises a plurality of coils, each enclosing a unique region. The coils have a configuration such that the magnetic field components produced vertical to the plane of the coils and located thereabove within an area bounded approximately by the coils' perimeter have near zero resultant magnetic field. The receiving means is adapted to detect magnetic field components within a region proximate to the antenna system. The receiving means comprises at least one coil configured to detect magnetic field components having a preselected resultant magnitude.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

The coplanar antenna system of the present invention can be fabricated in a number of diverse sizes and configurations. As a consequence, the invention will be found to function in a variety of applications wherein proximate surveillance systems are utilized. For illustrative purposes, the invention is described in connectiion with a proximate surveillance system utilizing magnetic markers wherein the antenna system is adapted to be placed on a counter top near a cashier to facilitate the removal of markers from purchased merchandise. It will be readily appreciated that the invention can be employed for similar and yet diversified applications wherein the size and configuration of the antenna system requires modification. Accordingly the invention is intended to encompass modifications of the preferred embodiment wherein similar output and response characteristics are obtained.

Figure 1:
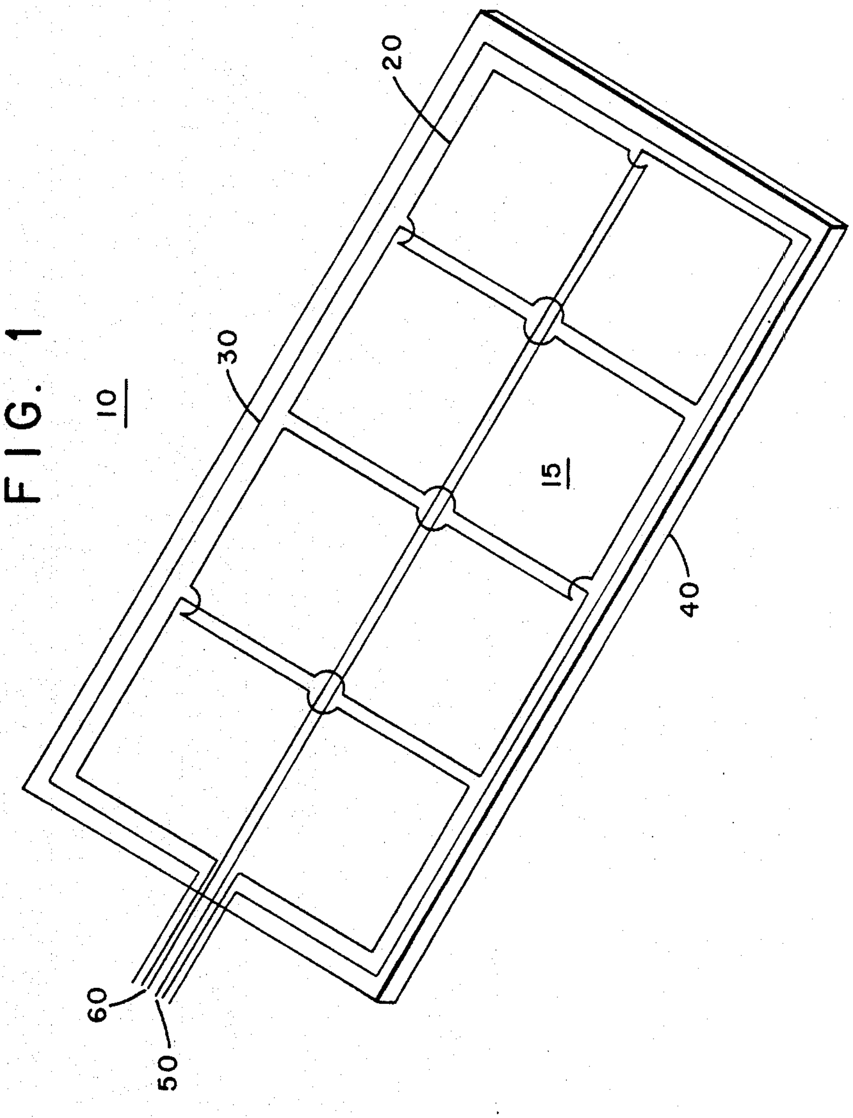
FIG. 1 is an isometric view of the coplanar antenna system.
Figure 2:
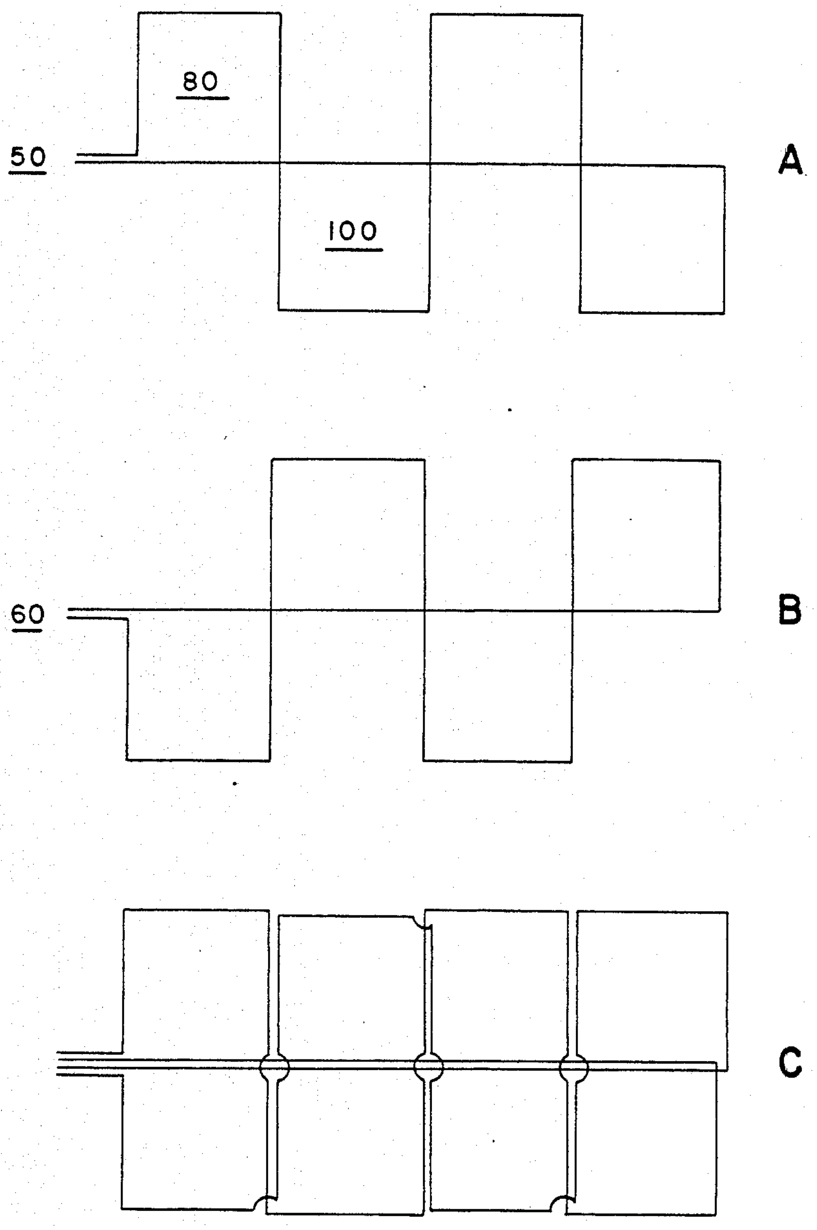
FIG. 2 is an assembly diagram of the interrogating means of the system of FIG. 1 wherein parts A and B depict individual coils of the interrogating means and part C depicts the assembled interrogation means.

Referring to FIG. 1 of the drawings, there is shown a coplanar antenna system 10 adapted for use in a proximate surveillance system which utilizes a magnetic marker. The coplanar antenna system 10 comprises an interrogating means 20 and a receiving means 30 enclosed within a low profile housing 40. The interrogating means 20 consists of two individual coils 50 and 60 each of which is adapted to be driven on and off with respect to each other. FIG. 2 of the drawings is an assembly diagram of the interrogating means 20 in which part A depicts the zig-zag loop configuration of coil 50, part B depicts coil 60, which is configured as the mirror image of coil 50, and part C displays the assembled interrogating means 20, in which coils 50 and 60 are positioned directly on top of each other. The receiving means 30 consists of a single coil, which is configured in such a manner as to enclose the interrogating means 20 within a single loop located on the same plane as the interrogating means 20.

Figure 3:
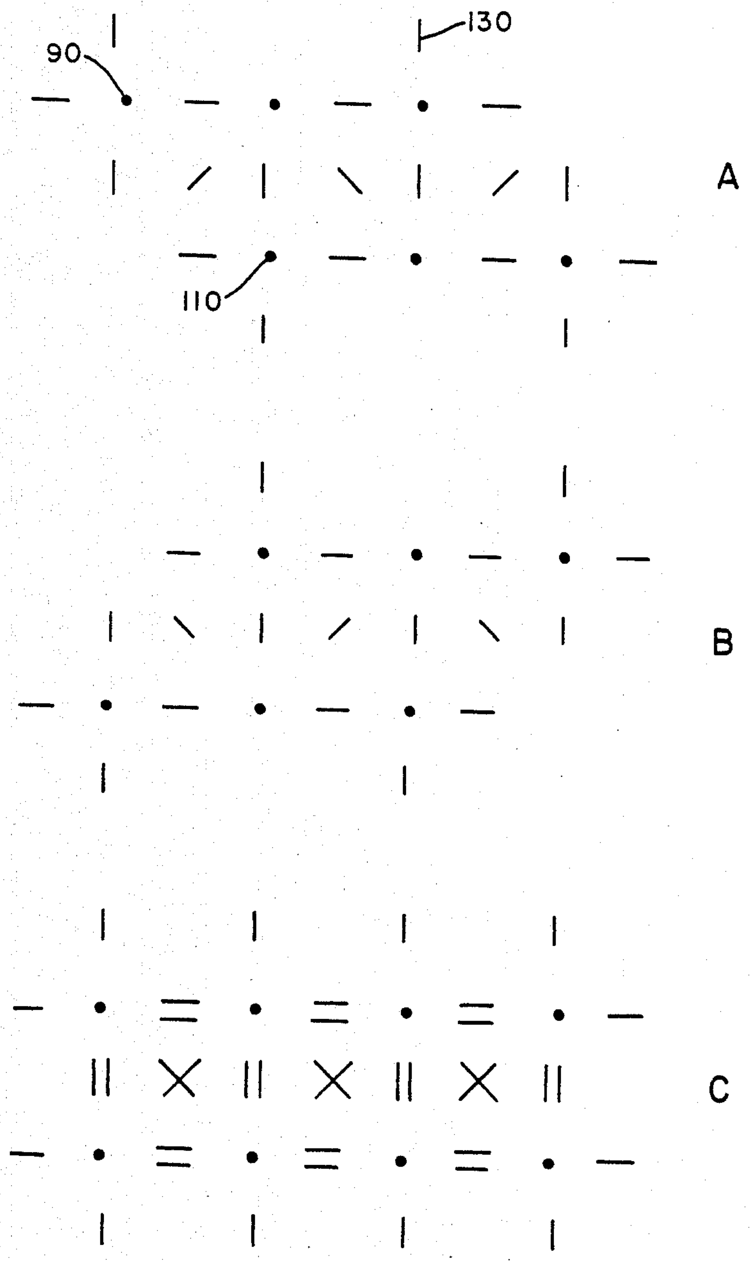
FIG. 3 a magnetic field diagram depicting vertical and horizontal magnetic field components corresponding to parts A, B, and C of FIG. 2; and, FIG. 4 is an isometric view of an alternate embodiment of the system of FIG. 1 in which the system of FIG. 1 is expanded to cover a larger area.

The interrogating means 20 is an important aspect of the invention, since a magnetic marker's response is directly dependant upon the orientation of the magnetic fields generated by the interrogating means 20. Referring to FIG. 3, there is illustrated a magnetic field diagram depicting the magnetic field orientations corresponding to parts A, B, and C of FIG. 2 wherein vertical and horizontal magnetic components are displayed. Coil 50 of FIG. 2, part A, produces magnetic field orientations corresponding to those displayed in FIG. 3 part A. The center of each loop 80 of coil 50 provides a vertical magnetic field component 90. Normally the field component 90 of a single loop will remain vertical at a remote distance (greater than 1 foot) from coil 50. However, the zig-zag loop configuration of the preferred embodiment provides diagonally opposing loops 80 and 100, whose vertical magnetic field components 90 and 110 are of opposite signs. Thus, these vertical components attract each other, creating a magnetic field which connects the centers of diagonally opposing loops 80 and 100. The position at which the vertical components 90 and 110 of the loops 80 and 100 bend to meet each other is determined by the size of the loops and the electrical current level in the coil 50. The invention requires the size of a loop's edge to be no greater than four times the length of the magnetic marker, and in the preferred embodiment, the loop's edge is approximately two times the length of the marker. The horizontal components 130 are located on the edge of each loop 80 perpendicular to the direction of the current path through the coil 50. The preferred embodiment of coil 50 comprises four loops configured in a zig-zag pattern in which the loops are diagonally opposing and each of them encloses a unique region. While the number of loops is not restricted, an even number of loops is preferred, as an even number of loops arranged in the aforesaid configuration generates a magnetic field in which components produced vertical to the plane of the coils and located thereabove within an area bounded approximately by the coils' perimeter have a near zero net magnetic field. Coil 60 of FIG. 2, part B is configured as the mirror image of coil 50. Thus, the vertical and horizontal magnetic field components generated by coil 60 (FIG. 3 part B) are the mirror images of the components generated by coil 50.

The assembled interrogating means 20 is shown in FIG. 2 part C wherein coils 50 and 60 are placed directly on top of each other to form a composite of loops, each of which encloses a unique region. The vertical and horizontal magnetic field components generated by the interrogating means 20 are depicted in FIG. 3, part C. These components represent the sum of the components generated by coils 50 and 60. As depicted, the components in FIG. 3 part C require coils 50 and 60 to be energized on and off with respect to each other. Thus, the interrogating means 20 generates time varying magnetic field components capable of energizing a magnetic marker located on or proximate (less than 1 foot) thereto, independent of the marker's orientation relative to antenna system 10.

The coplanar antenna system 10 operates to detect a magnetic marker when the marker is placed directly on top of the system 10 or is moved through or into the system's interrogation zone 15. Coplanar antenna system 10 is designed to restrict the interrogation zone 15 to a region proximate to the system 10. As used herein, the word "proximate" means a region extending less than 12 inches above the plane of the coplanar antenna system 10.

The interrogating means 20 of system 10 generates time varying or dynamic magnetic field components which enhance ability of system 10 to detect stationary as well as moving markers within the interrogation zone 15. The dynamic field components are generated by alternately energizing coils 50 and 60 of the interrogating means 20. The configuration of coils 50 and 60 are an important aspect of the invention. Each interrogating coil comprises a series of diagonally opposing loops, each of which encloses a unique region. In the absence of this configuration, two loops enclosing a common region, when energized, will generate a reverse induced magnetic field in each other which decreases the resultant magnetic field strength and alters the resultant magnetic component configuration. Each loop of the present invention's interrogating coils encloses a unique region which eliminates the generation of reverse induced magnetic fields in each other. The diagonally opposing loops of coils 50 and 60 generate a near zero net induced magnetic field, enabling the receiving means 30 to detect within the interrogation zone 15 a marker having a preselected net resultant magnetic field.

In the arrangement of the system 10 described above, the interrogating means 20 and the receiving means 30 can be configured to substantially reduce the energy transfer therebetween (Transformer Effect) even if the interrogating means comprises an odd number of loops.

When the interrogating means 20 comprises an even number of loops, as shown in FIG. 1, the Transformer Effect is minimized. Accordingly, the embodiment of the invention shown in FIG. 1 is preferred.

Figure 4:
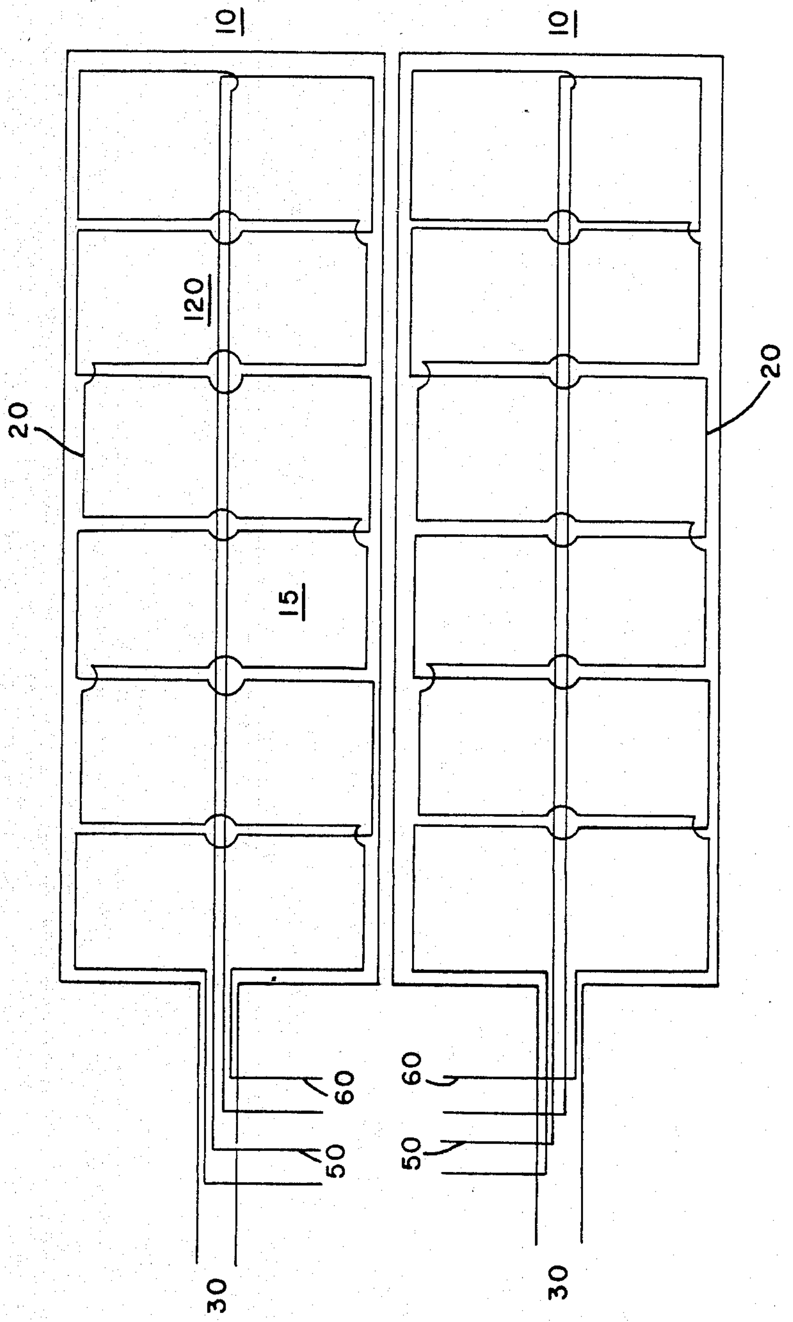

The size of loops 80 and 100 of interrogation means 20 is dependent upon the size of the magnetic markers appointed for detection and the desired range (height) of the interrogation zone 15. The length of one edge of each of loops 80 and 100 ranges from 2 to 4 times the length of the magnetic marker used therewith. Once the loop size has been determined, the area covered by the interrogation zone 15 of system 10 can be increased as shown in FIG. 4. The length of the interrogation zone 15 may be increased by adding additional diagonally opposing loops 120 to the coils 50 and 60 of the interrogation means 20 and extending the single loop of receiving means 30 to enclose the extended interrogation means 20. The width of interrogation zone 15 may be increased by placing identical antenna systems 10, 10′ side by side and connecting the interrogation means 20, 20′ thereof together with each of identical coils 50, 50′ and 60, 60′ in parallel, respectively. In this manner the interrogation zone 15 of the coplanar antenna system 10 can be expanded in uniform increments.

Having thus described the invention in rather full detail, it will be understood that such detail need not be strictly adhered to, but that various changes and modifications may suggest themselves to one skilled in the art, all falling within the scope of the invention as defined by the subjoined claims.

What we claim is:

1. A coplanar antenna system, comprising:

(a) interrogating means adapted to generate time varying magnetic field components within a region proximate thereto, and comprising two coils, each enclosing a unique region, said coils being adapted to be driven on and off with respect to each other and having a configuration such that said components, when produced vertical to the plane of the coils, and located thereabove within an area approximated by the coils' perimeter, have near zero net resultant magnetic field; and (b) receiving means adapted to detect magnetic field components within a region proximate to said antenna system and comprising at least one coil configured to detect components having a preselected net resultant magnetic field.

2. A coplanar antenna system as recited in claim 1, wherein said coils of said interrogating means have a zig-zag loop configuration constructed in such a manner as to be mirror images of each other positioned directly on top of each other, and each of said loops encloses a unique region.

3. A coplanar antenna system as recited in claim 1, wherein said receiving means comprises a single coil configured in such a manner as to enclose said interrogating means within the single loop located on the same plane as the said interrogating means.

4. A coplanar antenna systenm as recited in claim 1, wherein said antenna system is adapted to provide an interrogation zone within which a magnetic marker of a proximate surveillance system is responsive.

5. A coplanar antenna system as recited in claim 4, wherein said antenna system is adapted to enlarge said interrogation zone by linking together a plurality of said antenna systems, the interrogating means of each of said antenna systems being connected with identical coils in parallel.

6. A coplanar antenna system as recited in claim 2, wherein each of said coils of said interrogating means has an odd number of loops.

7. A coplanar antenna system as recited in claim 2, wherein each of said coils of said interrogating means has an even number of loops.

* * * * *